United States Patent
Benoit et al.

(10) Patent No.: US 9,288,672 B2
(45) Date of Patent: Mar. 15, 2016

(54) METHOD FOR CONFIGURING A REMOTE STATION WITH A CERTIFICATE FROM A LOCAL ROOT CERTIFICATE AUTHORITY FOR SECURING A WIRELESS NETWORK

(71) Applicant: QUALCOMM Incorporated, San Diego, CA (US)

(72) Inventors: Olivier Jean Benoit, San Diego, CA (US); Cameron Allen George McDonald, Queenscliff (AU)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/207,005

(22) Filed: Mar. 12, 2014

(65) Prior Publication Data

US 2015/0089216 A1   Mar. 26, 2015

Related U.S. Application Data

(60) Provisional application No. 61/881,355, filed on Sep. 23, 2013.

(51) Int. Cl.
| | |
|---|---|
| *H04L 29/06* | (2006.01) |
| *H04W 12/06* | (2009.01) |
| *H04L 9/32* | (2006.01) |
| *H04W 12/04* | (2009.01) |

(52) U.S. Cl.
CPC .............. *H04W 12/06* (2013.01); *H04L 9/321* (2013.01); *H04L 9/3265* (2013.01); *H04W 12/04* (2013.01); *H04L 63/0823* (2013.01); *H04L 2209/805* (2013.01)

(58) Field of Classification Search
USPC ........................................................ 713/156
See application file for complete search history.

(56) References Cited

U.S. PATENT DOCUMENTS

| | | | | |
|---|---|---|---|---|
| 6,370,249 | B1 * | 4/2002 | Van Oorschot | 380/277 |
| 6,513,116 | B1 * | 1/2003 | Valente | 713/155 |
| 8,627,064 | B2 * | 1/2014 | Salvarani et al. | 713/156 |
| 2003/0088772 | A1 * | 5/2003 | Gehrmann et al. | 713/175 |
| 2006/0064390 | A1 * | 3/2006 | Pauly | 705/60 |
| 2010/0049970 | A1 * | 2/2010 | Fraleigh et al. | 713/156 |
| 2012/0246466 | A1 * | 9/2012 | Salvarani et al. | 713/156 |
| 2013/0007442 | A1 | 1/2013 | Mao et al. | |
| 2015/0188929 | A1 * | 7/2015 | Kitahara et al. | 726/10 |

OTHER PUBLICATIONS

Wi-Fi Protected Setup Specification Version 1.0h|http://www.google.com/url?sa=t&rct=j&q=&esrc=s&frm=1&source=web&cd=1&cad=rja&uact=8&ved=0CB4QFjAA&url=http%3A%2F%2Fcfile28.uf.tistory.com%2Fattach%2F16132E3C50FCFFCB3EC74E&ei=zD3rVMKHEsLksASW9ICoCw&usg=AFQjCNFFn6gEFiuQko_-DlxSODgzOfRYEA&sig2=7H9CISpfoEhp_K53RxFjmw&bvm=bv.86475890,d.aWw.*

(Continued)

*Primary Examiner* — Mahfuzur Rahman

(74) *Attorney, Agent, or Firm* — Loza & Loza, LLP

(57) ABSTRACT

A remote station is configured with a certificate from a local root certificate authority for securing a wireless network. To configure the certificate, the remote station forwards a station public key to the local root certificate authority. The station public key is forwarded out-of-band of the wireless network. The remote station receives a certificate and a root public key from the local root certificate authority. The certificate is generated by the local root certificate authority based on the forwarded station public key, and the certificate and the root public key are received out-of-band of the wireless network. The remote station securely communicates, using the wireless network, with another station based on the certificate and the root public key.

24 Claims, 5 Drawing Sheets

(56) References Cited

OTHER PUBLICATIONS

Dec. 2006|pp. 1-110|Wi Fi Alliance.*
Security Protocols for Sensor Networks|http://www.csee.umbc.edu/courses/graduate/CMSC691A/Spring04/papers/spins-wine-journal.pdf|Perrig et al.|2002|pp. 1-14.*

International Search Report and Written Opinion—PCT/US2014/056661—ISA/EPO—Feb. 16, 2015.
International Preliminary Report on Patentability—PCT/US2014/056661, The International Bureau of WIPO—Geneva, Switzerland, Dec. 8, 2015.

* cited by examiner

METHOD FOR CONFIGURING A REMOTE STATION WITH A CERTIFICATE FROM A LOCAL ROOT CERTIFICATE AUTHORITY FOR SECURING A WIRELESS NETWORK

CROSS-REFERENCE TO RELATED APPLICATION

This application claims the benefit of U.S. Provisional Application No. 61/881,355, filed Sep. 23, 2013, which application is incorporated herein by reference.

BACKGROUND

1. Field

The present invention relates generally to configuring a remote station with a digital certificate from a local root certificate authority for securing a wireless network.

2. Background

A secure private wireless network needs to authorize only legitimate devices or stations to join the network. The authorization of a device should include the authentication of the device. Authentication generally relies on a password, secret keys (challenge-response authentication), or a public key previously exchanged in a secure manner.

Digital certificates (hereinafter certificates) issued by a global certificate authority are not helpful because all devices having a certificate from the global certificate authority will be authenticated and considered legitimate. As a result, an access point of a private wireless network may not deny access to a neighbor's device based on a certificate from the global certificate authority because the certificate will be valid.

Also, the numeric values of a certificate and corresponding private key are very large. It may not be reasonable to expect a user to manually enter such values.

There is therefore a need for a technique for configuring a remote station with a certificate for securing a wireless network in an effective manner.

SUMMARY

An aspect of the present invention may reside in a method for configuring a remote station with a certificate from a local root certificate authority for securing a wireless network. In the method, a station public key is forwarded to the local root certificate authority. The station public key is forwarded out-of-band of the wireless network. A certificate and a root public key are received from the local root certificate authority. The certificate is based on the forwarded station public key, and the certificate and the root public key are received out-of-band of the wireless network. The remote station securely communicates, using the wireless network, with another station based on the certificate and the root public key.

In more detailed aspects of the invention, the station public key may be forwarded to the local root certificate authority, and the certificate and the root public key may be received from the local root certificate authority, using a bi-directional communication channel such as a Bluetooth low energy communication channel or a near field communication channel. Also, the certificate may comprise the station public key and a device identifier. The root public key may be a root-of-trust public key included in a self-signed certificate.

In other more detailed aspects of the invention, the remote station securely communicating with the another station may be further based on another certificate configured in the another station, and the root public key configured in the remote station and in the another station, and may include the remote station verifying a validity of the another certificate of the another station. Verifying the validity of the another certificate comprises at least one of: verifying the another certificate's signature with the root public key; verifying the another certificate is not on a Certificate Revocation List; verifying the another certificate's status using an Online Certificate Status Protocol; and/or verifying the another certificate's validity dates.

In other more detailed aspects of the invention, the wireless network may consist of only the remote station and the another station communicating using Wi-Fi Direct or Peer-to-Peer. Also, the wireless network may be a long term evolution (LTE) direct communication network, or a mesh WiFi network. The local root certificate authority may be a configurator of the wireless network such as a smartphone, a tablet, or a personal computer. Such wireless station may have a key pair and an internally received certificate in order to communicate with other stations. Also, the remote station may comprise a wireless access point.

Another aspect of the invention may reside in a remote station, comprising: means for forwarding a station public key to a local root certificate authority, wherein the station public key is forwarded out-of-band of a wireless network; means for receiving a certificate and a root public key from the local root certificate authority, wherein the certificate is based on the forwarded station public key, and the certificate and the root public key are received out-of-band of the wireless network; and means for securely communicating, using the wireless network, with another station based on the certificate and the root public key.

Another aspect of the invention may reside in a remote station, comprising: a processor configured to: forward a station public key to a local root certificate authority, wherein the station public key is forwarded out-of-band of a wireless network; receive a certificate and a root public key from the local root certificate authority, wherein the certificate is based on the forwarded station public key, and the certificate and the root public key are received out-of-band of the wireless network; and securely communicate, using the wireless network, with another station based on the certificate and the root public key.

Another aspect of the invention may reside in a computer program product, comprising: computer-readable medium, comprising: code for causing a computer to forward a station public key to a local root certificate authority, wherein the station public key is forwarded out-of-band of a wireless network; code for causing a computer to receive a certificate and a root public key from the local root certificate authority, wherein the certificate is based on the forwarded station public key, and the certificate and the root public key are received out-of-band of the wireless network; and code for causing a computer to securely communicate, using the wireless network, with another station based on the certificate and the root public key.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
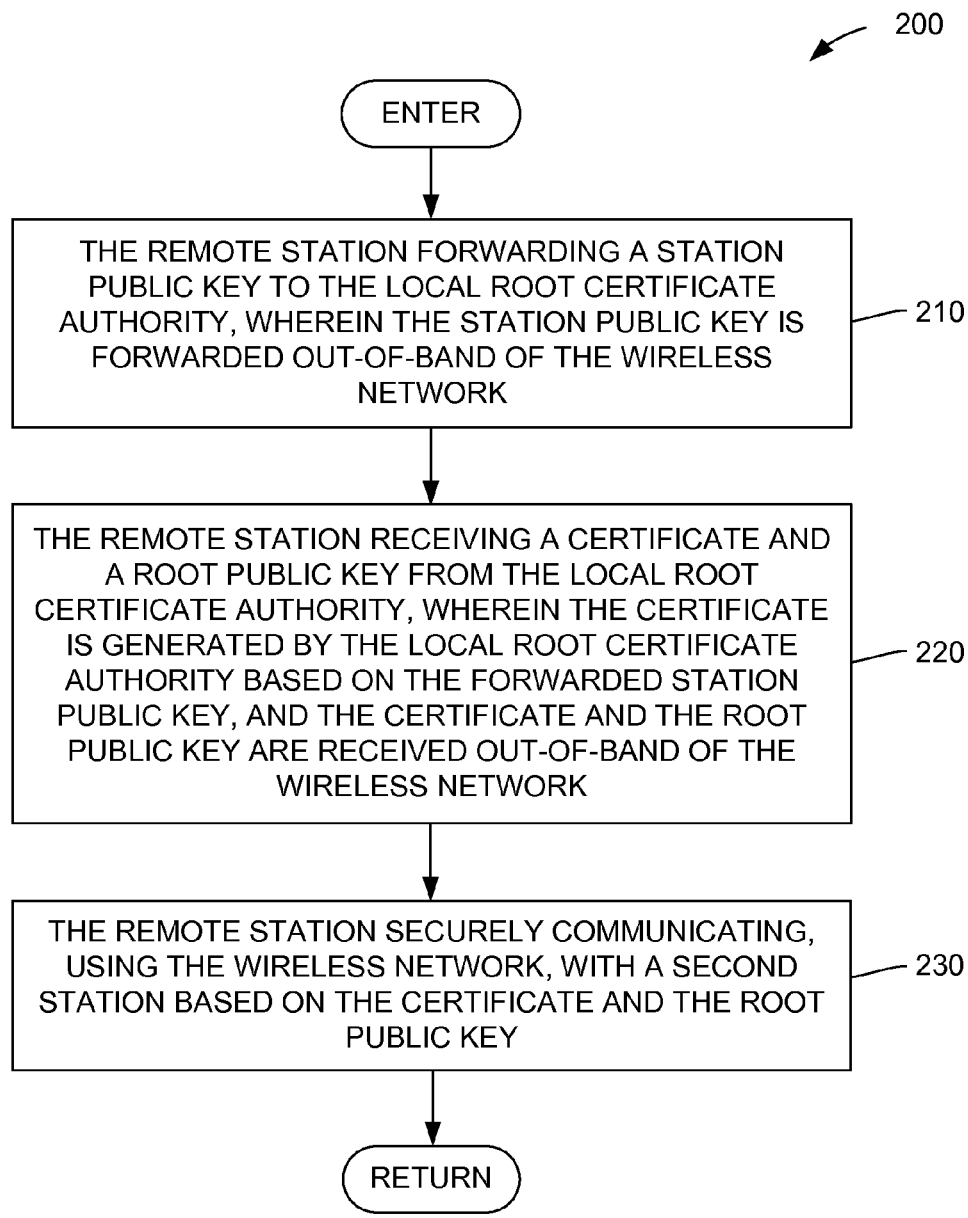
FIG. 2 is a flow diagram of a method for configuring a remote station with a certificate from a local root certificate authority for securing a wireless network, according to the present invention.
Figure 3:
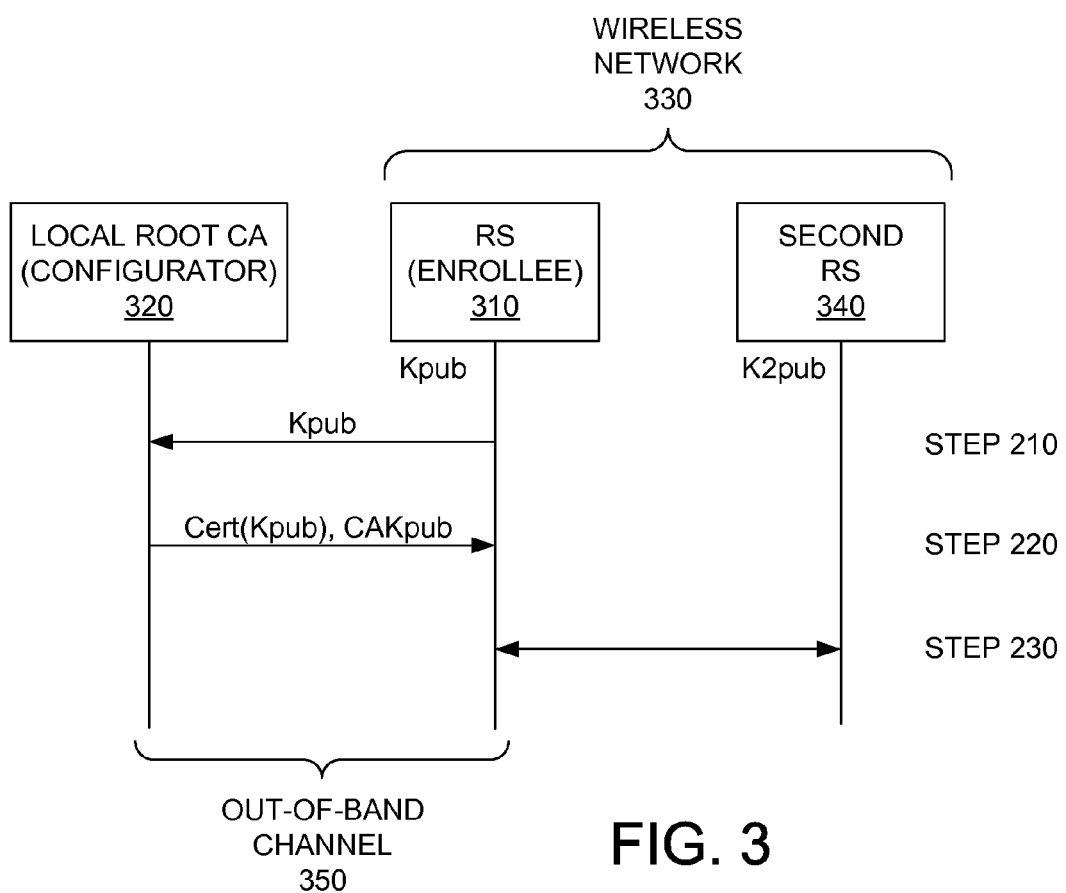
FIG. 3 is a block diagram of the method for configuring a remote station with a certificate from a local root certificate authority for securing a wireless network, according to the present invention.

With reference to FIGS. 2 and 3, an aspect of the present invention may reside in a method 200 for configuring a remote station 310 with a certificate (such as type X.509) from a local root certificate authority 320 for securing a wireless network 330. The remote station may be a first station and the certificate may be a first certificate. In the method, the remote station 310 forwards a station public key Kpub to the local root certificate authority 320 (step 210). The station public key is forwarded out-of-band of the wireless network. The remote station receives a certificate Cert(Kpub) and a root public key CAKpub from the local root certificate authority (step 220). The certificate is generated by the local root certificate authority based on the forwarded station public key, and the certificate and the root public key are received out-of-band of the wireless network. The remote station securely communicates, using the wireless network, with another station 340 based on the certificate and the root public key (step 230). The another station may be a second station.

In addition to its public key, the remote station 310 may also forward its identity which includes at least one of its Medium Access Control (MAC) address, its Serial Number (SN), its device class, type and/or model. The device identity is included in the certificate. The certificate may be generated based on the forwarded station public key and a validity date (defined by the user).

In more detailed aspects of the invention, the station public key Kpub may be forwarded to the local root certificate authority 320, and the certificate CertKpub and the root public key CAKpub may be received from the local root certificate authority, using a bi-directional communication channel 350 such as a Bluetooth low energy (BLE) communication channel, a near field communication (NFC) channel, or similar close wireless communication channel, or using a private wired communication channel (USB, Ethernet, etc.). The certificate may be a temporary certificate having short lifetime. Also, the certificate may comprise the station public key and a device identifier. The root public key may be a root-of-trust public key included in a self-signed certificate.

In other more detailed aspects of the invention, the remote station 310 securely communicating with the second station 340 may be further based on a second certificate Cert(K2pub) configured in the second station, and the root public key CAKpub configured in the remote station and in the second station, and may include the remote station verifying a validity of the second station's certificate. Verifying the validity of the second station's certificate comprises at least one of: verifying the second certificate's signature with the root public key; verifying the second certificate is not on a Certificate Revocation List; verifying the second certificate's status using an Online Certificate Status Protocol; and/or verifying the second certificate's validity dates.

In other more detailed aspects of the invention, the wireless network 330 may consist of only the remote station 310 and the second station 340 communicating using Wi-Fi Direct or Peer-to-Peer. Also, the wireless network 330 may be a long term evolution (LTE) direct communication network, or a mesh WiFi network. The local root certificate authority 320 may be a configurator of the wireless network such as a smartphone, a tablet, or a personal computer (PC). The remote station may have a wireless interface. Also, the remote station may comprise a wireless access point.

Figure 4:
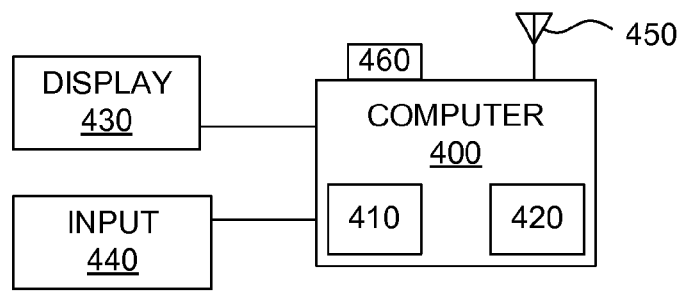
FIG. 4 is a block diagram of a computer including a processor and a memory.

With further reference to FIG. 4, the remote station 310 may comprise a computer 400 that includes a processor 410, a storage medium 420 such as memory and/or a disk drive, a display 430, and an input such as a keypad 440, a wireless connection 450, such as a Wi-Fi connection and/or cellular connection, and an out-of-band communication interface 460, such as an NFC and/or BLE connection.

Another aspect of the invention may reside in a remote station 310, comprising: means 410 for forwarding a station public key Kpub to a local root certificate authority 320, wherein the station public key is forwarded out-of-band of a wireless network 330; means 410 for receiving a certificate Cert(Kpub) and a root public key CAKpub from the local root certificate authority, wherein the certificate is generated by the local root certificate authority based on the forwarded station public key, and the certificate and the root public key are received out-of-band of the wireless network; and means 410 for securely communicating, using the wireless network, with a second station 340 based on the certificate and the root public key.

Another aspect of the invention may reside in a remote station 310, comprising: a processor 410 configured to: forward a station public key Kpub to a local root certificate authority 320, wherein the station public key is forwarded out-of-band of a wireless network 330; receive a certificate Cert(Kpub) and a root public key CAKpub from the local root certificate authority, wherein the certificate is generated by the local root certificate authority based on the forwarded station public key, and the certificate and the root public key are received out-of-band of the wireless network; and securely communicate, using the wireless network, with a second station 340 based on the certificate and the root public key.

Another aspect of the invention may reside in a computer program product, comprising: computer-readable medium 420, comprising: code for causing a computer 400 to forward a station public key Kpub to a local root certificate authority 320, wherein the station public key is forwarded out-of-band of a wireless network 330; code for causing a computer to receive a certificate Cert(Kpub) and a root public key CAKpub from the local root certificate authority, wherein the certificate is generated by the local root certificate authority based on the forwarded station public key, and the certificate and the root public key are received out-of-band of the wireless network; and code for causing a computer to securely communicate, using the wireless network, with a second station 340 based on the certificate and the root public key.

Figure 5:
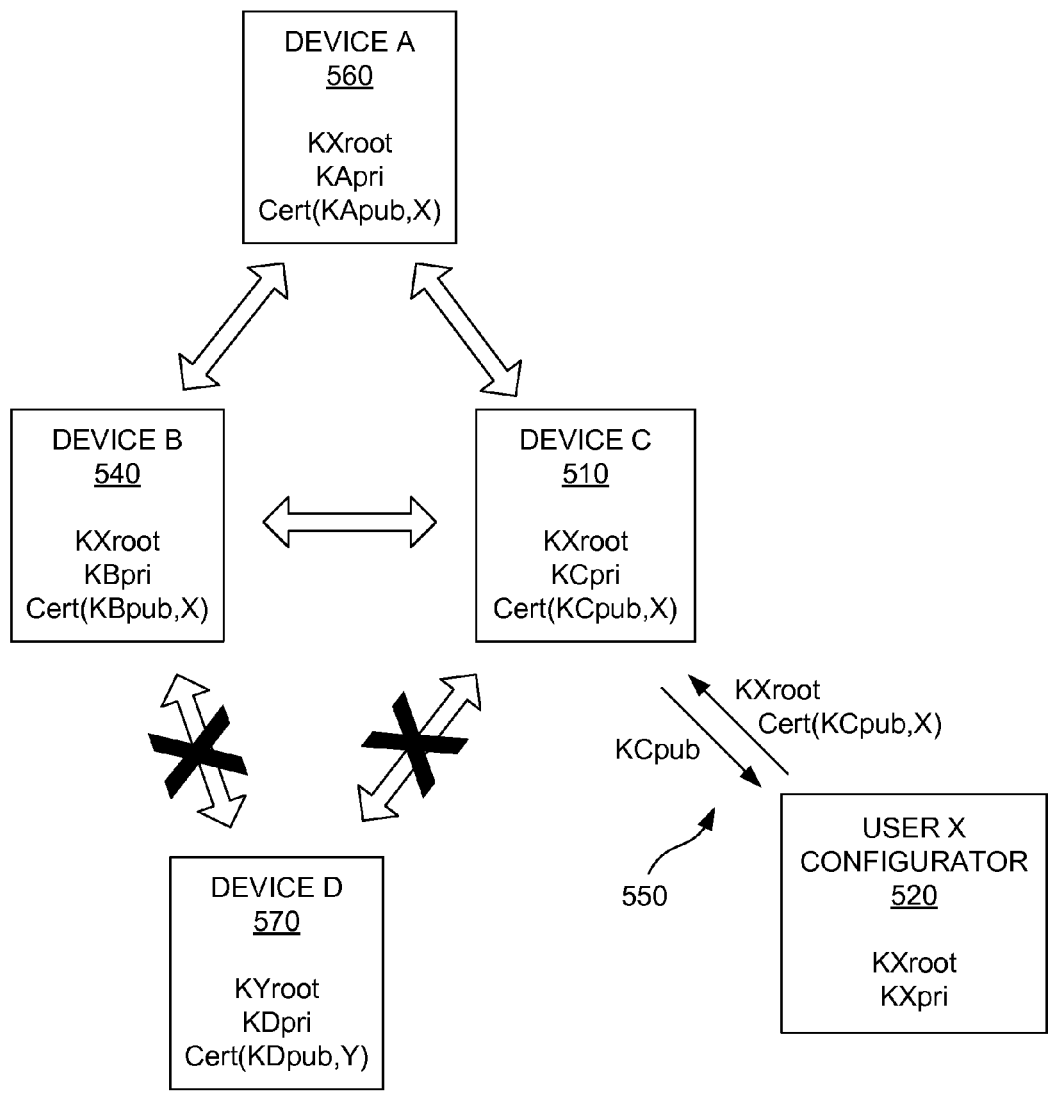
FIG. 5 is a block diagram of a remote station, a configurator, other stations of a secure private wireless network, and a station of another network.

With reference to FIG. 5, as device A 560 and device B 540 are owned by user X and previously have been configured by user X using the configurator 520. The configurator for user X has a first root public key KXroot and a corresponding private key KXpri. As a result of the previous configuration, device A has the first root public key and a device A certificate cert (KApub,X), which is signed using the private key KXpri, and device B similarly has the first root public key and a device B certificate cert(KBpub,X), which is also signed using the private key KXpri. Devices A and B also have respective private keys, KApri and KBpri, for decrypting data encrypted using the corresponding public keys, KApub and KBpub or, alternatively, for performing a Diffie-Hellman Key Exchange in order to establish a shared secret key to encrypt and authenticate further data exchange.

User X purchases device C 510 and desires to configure it to join the secure private wireless network of devices A and B. In an enrollment process, device C, as an enrollee, forwards its public key KCpub to the configurator 520 of user X, which returns its root public key KXroot and a certificate Cert(KCpub,X) signed by its private key KXpri. The new device C is now able to securely communicate with devices A and B using the certificate Cert(KCpub,X) and the root public key. Device C uses the root public key to verify the certificates of devices A and B.

Thus, device C may now establish a secure link at level L2 with devices A and B (direct or infrastructure mode). However, device C cannot communicate with device D 570 owned by user Y because device C cannot authenticate device D. Likewise, device D's certificate Cert(KDpub,Y), which is signed using the private key KYpri, cannot be used to authenticate with devices A, B and C.

The certificates issued by the local root certificate authority (e.g., 320 in FIG. 3, and 520 in FIG. 5) are bound to the user. All devices of the user are certified by the user's certificate authority. A user Y device certificate will not be valid for a user X device. The certificates allow secure communication between two enrolled (and configured) devices of a given user without any previous exchange between the two devices. The certificates allow the use of a mesh network, which may include secure Wi-Fi direct communication between two configured devices without relying on a master shared key. An infrastructure (star) network also may be used. The devices may be from different manufacturers and of a variety of types (access point (AP), printer, sensor, camera, smartphone, etc.) The user's local root certificate authority is under the control and management of the user. This may be accomplished through an abstraction interface on the configurator. The user does not need to trust any third party.

In the enrollment process, the enrollee requires an out-of-band bi-directional communication channel 550 with the configurator. The enrollee also requires key storage, including its device private key, and is required to be able to perform certificate verification. The configurator requires an out-of-band bi-directional communication channel 550 with the enrollee. The configurator also requires key storage, including its certificate authority/root private key, and is required to be able to perform certificate generation.

The user may provide guest access to the secure private wireless network by providing a temporary certificate to the guest which is valid for a limited period of time such as an hour, a day, a week, etc. If a device is lost or stolen, the user may put the device's certificate on a revocation list (another PKI feature). An application on the user's smartphone, PC, tablet, etc., may provide all of the functions of the local root certificate authority, including: certificate generation, certificate revocation, authorization, CRL management and/or Online Certificate Status Protocol service. The process of providing parameters to and/or receiving parameters from a device may be considered "configuration."

The device hosting the local root CA, i.e., the configurator 320, may also be a wireless station with its own key pair and certificate in order to communicate in-band (using the primary wireless interface) with any of the devices already part of the wireless network 330.

Figure 6:
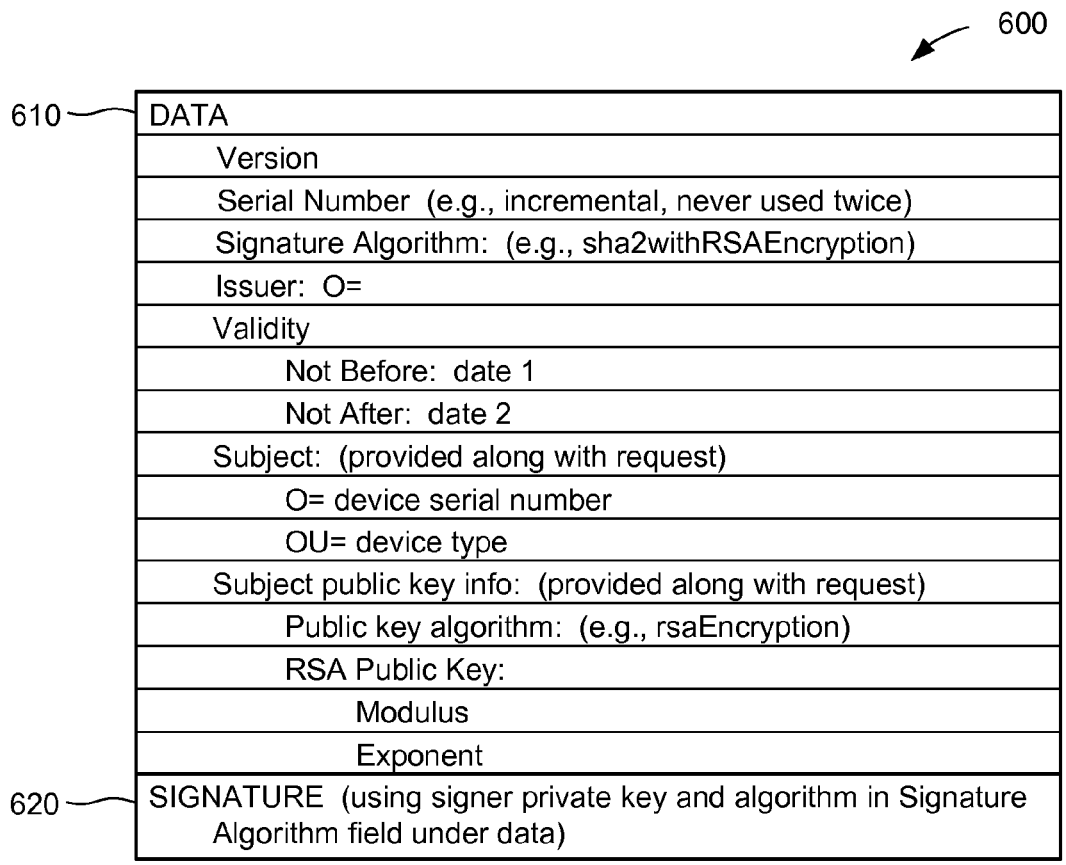
FIG. 6 is a schematic diagram of a certificate.

A certificate 600 that may be generated by the local root certificate authority 320 is shown in FIG. 6. The certificate 600 may be of a type in accordance with the X.509 standard. The certificate 600 may include a data field or portion 610 and a signature field or portion 620. The data field may include a version field, a serial number field, a signature algorithm field, an issuer field, a validity field with a not before date field, a not after date field, a subject field with a device serial number field and a device type field, a subject public key info field, a public key algorithm field, and a public key field with a modulus field and an exponent field. The public key field may correspond to the station public key Kpub forwarded to the local root certificate authority 320. The station public key may be based on the RSA encryption algorithm. The signature value in the signature field 620 may be generated using the information/values in the data field 610, the signer's private (i.e., the private key of the local root certificate authority 320), and the algorithm in the signal algorithm field (e.g., Sha2 with RSA encryption, or "sha2withRSAEncryption"). The certificate 600 is generated from a combination of the data field 610 and the signature field 620. A change to the information/values in the data field may be detected using the signature.

Figure 7:
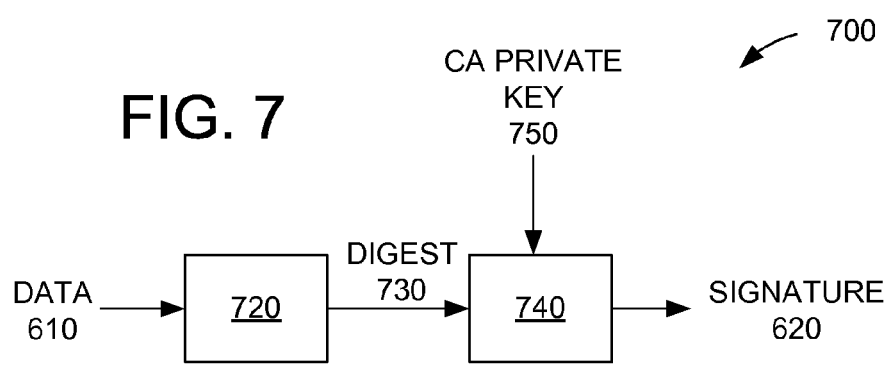
FIG. 7 is a block diagram of a method for generating a signature from a certificate's data and a certificate authority's private key.

A method 700 for generating the signature of the certificate 600 is shown in FIG. 7. The information in the data field 610 is input into a hash function 720, e.g., SHA2 or SHA3, to generate a digest 730. The digest is input into an algorithm, e.g., the RSA encryption algorithm, and signed using a certificate authority (CA) private key 750, e.g., the private key CAKPri of the local root certificate authority 320, to generate the signature value in the signature field 620. The certificate authority private key CAKpri and the certificate authority public key CAKpub are an asymmetric key pair. Likewise, the private key Kpri and the public key Kpub of the remote station 310 are an asymmetric key pair.

Figure 1:
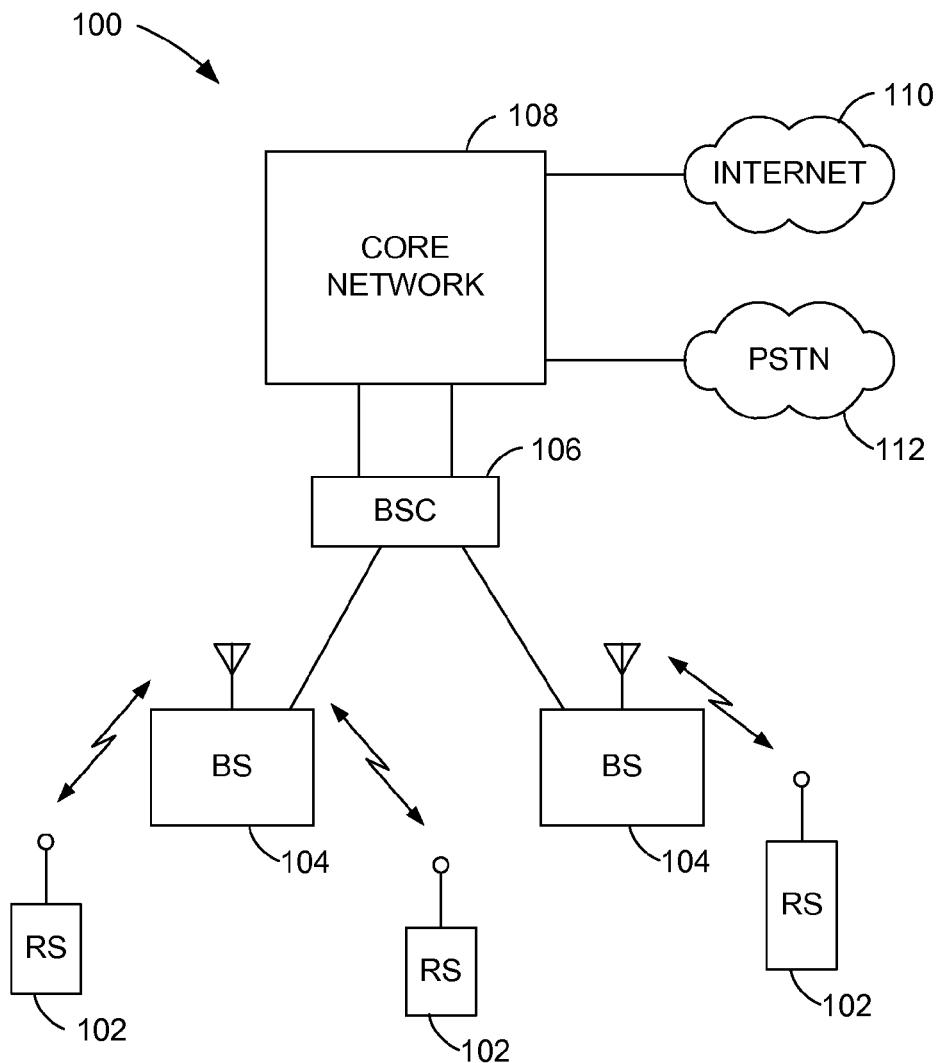
FIG. 1 is a block diagram of an example of a wireless communication system.

With reference to FIG. 1, a wireless remote station (RS) 102 (e.g., the remote station 310 and the second station 340 in FIG. 3) may communicate with one or more base stations (BS) 104 of a wireless communication system 100. The RS may be a mobile station. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for configuring a remote station with a certificate from a local root certificate authority for securing a wireless network, comprising:
   forwarding a station public key to the local root certificate authority, wherein the station public key is forwarded out-of-band of the wireless network;
   receiving a certificate and a root public key from the local root certificate authority, wherein the certificate comprises the forwarded station public key and a device identifier, and the certificate and the root public key are received out-of-band of the wireless network; and
   securely communicating, using the wireless network, with another station based on the certificate and the root public key configured in the another station, and based on verifying, using the root public key configured in the remote station, a validity of another certificate received from the another station.

2. The method of claim 1, wherein the station public key is forwarded to the local root certificate authority, and the certificate and the root public key are received from the local root certificate authority, using a bi-directional communication channel.

3. The method of claim 1, wherein the station public key is forwarded to the local root certificate authority, and the certificate and the root public key are received from the local root certificate authority, using a Bluetooth low energy communication channel.

4. The method of claim 1, wherein the station public key is forwarded to the local root certificate authority, and the certificate and the root public key are received from the local root certificate authority, using a near field communication channel.

5. The method of claim 1, wherein the root public key is a root-of-trust public key included in a self-signed certificate.

6. The method of claim 1, wherein the root public key is included in a self-signed certificate.

7. The method of claim 6, wherein verifying the validity of the another certificate comprises at least one of:
   verifying a signature of the another certificate with the root public key;
   verifying the another certificate is not on a Certificate Revocation List;
   verifying a status of the another certificate using an Online Certificate Status Protocol; and/or
   verifying validity dates of the another certificate.

8. The method of claim 1, wherein the wireless network consists of only the remote station and the another station communicating using Wi-Fi Direct or Peer-to-Peer.

9. The method of claim 1, wherein the wireless network is a long term evolution (LTE) direct communication network.

10. The method of claim 1, wherein the wireless network is a mesh WiFi network.

11. The method of claim 1, wherein the local root certificate authority is a configurator of the wireless network.

12. The method claim 11, wherein the configurator is also a wireless station with a key pair.

13. The method of claim 12, wherein the wireless station received internally a certificate from the local root certificate authority in order to communicate with other stations.

14. The method of claim 1, wherein the remote station comprises a wireless access point.

15. A remote station, comprising:
   means for forwarding a station public key to a local root certificate authority, wherein the station public key is forwarded out-of-band of a wireless network;
   means for receiving a certificate and a root public key from the local root certificate authority, wherein the certificate comprises the forwarded station public key and a device identifier, and the certificate and the root public key are received out-of-band of the wireless network; and
   means for securely communicating, using the wireless network, with another station based on the certificate and the root public key configured in the another station, and based on verifying, using the root public key configured in the remote station, a validity of another certificate received from the another station.

16. The remote station of claim 15, wherein the root public key is a root-of-trust public key included in a self-signed certificate.

17. The remote station of claim 15, wherein the root public key is included in a self-signed certificate.

18. The remote station of claim 17, wherein the means for verifying the validity of the another certificate comprises at least one of:
   means for verifying a signature of the another certificate with the root public key;
   means for verifying the another certificate is not on a Certificate Revocation List;
   means for verifying a status of the another certificate using an Online Certificate Status Protocol; and/or
   means for verifying validity dates of the another certificate.

19. A remote station, comprising:
   a hardware processor configured to:
      forward a station public key to a local root certificate authority, wherein the station public key is forwarded out-of-band of a wireless network;
      receive a certificate and a root public key from the local root certificate authority, wherein the certificate comprises the forwarded station public key and a device identifier, and the certificate and the root public key are received out-of-band of the wireless network; and
      securely communicate, using the wireless network, with another station based on the certificate and the root public key configured in the another station, and based on verifying, using the root public key configured in the remote station, a validity of another certificate received from the another station.

20. The remote station of claim 19, wherein the root public key is included in a self-signed certificate.

21. The remote station of claim 20, wherein to verify the validity of the another certificate comprises at least one of:
   verify a signature of the another certificate with the root public key;
   verify the another certificate is not on a Certificate Revocation List;
   verify a status of the another certificate using an Online Certificate Status Protocol; and/or
   verify validity dates of the another certificate.

22. A non-transitory computer-readable medium, comprising:
   code for causing a computer to forward a station public key to a local root certificate authority, wherein the station public key is forwarded out-of-band of a wireless network;
   code for causing a computer to receive a certificate and a root public key from the local root certificate authority, wherein the certificate comprises the forwarded station public key and a device identifier, and the certificate and the root public key are received out-of-band of the wireless network; and
   code for causing a computer to securely communicate, using the wireless network, with another station based on the certificate and the root public key configured in the another station, and based on verifying, using the root public key configured in the computer, a validity of another certificate received from the another station.

23. The non-transitory computer-readable medium of claim 22, wherein the root public key is included in a self-signed certificate.

24. The non-transitory computer-readable medium of claim 23, wherein to verify the validity of the another certificate comprises at least one of:
   verify a signature of the another certificate with the root public key;
   verify the another certificate is not on a Certificate Revocation List;
   verify a status of the another certificate using an Online Certificate Status Protocol; and/or
   verify validity dates of the another certificate.

* * * * *